Patented Jan. 9, 1934

1,943,246

UNITED STATES PATENT OFFICE 1,943,246

PYROLYSIS OF HYDROCARBON GASES

Charles C. Towne, Elizabeth, N. J., assignor to The Texas Company, New York, N. Y., a corporation of Delaware No Drawing. Application January 28, 1931 Serial No. 511,928

2 Claims. (Cl. 260—168)

This invention relates to the pyrolysis of hydrocarbon gases and has to do particularly with the catalytic treatment, at high temperatures, of paraffin and unsaturated aliphatic or straight chain petroleum hydrocarbons, such as natural and refinery gases of lower molecular weight than the hydrocarbon constituents of commercial gasoline, to produce liquid aromatic compounds and other valuable by-products.

An important object of the invention is to produce low boiling liquid aromatic products such as benzol, toluol and xylol, which may be used in the production of motor fuel, especially motor fuels of high anti-knock quality.

Another object of the invention is to recover valuable by-products, chiefly solid in character, such as naphthalene, anthracene, and other similar condensed ring derivatives.

A further object of the invention is to produce valuable materials comprising elemental products, such as hydrogen or carbon, and unsaturated gaseous hydrocarbons, which may be chemically treated by suitable reagents or by oxidation to produce alcohols and other liquid products for use as fuels, solvents or as ingredients in the production of lacquers and like materials.

A further object of the invention is to provide suitable catalysts for the reaction which will increase the yield of desirable materials above the yields ordinarily obtainable by the use of temperature alone.

The invention contemplates, broadly, the treatment of any petroleum hydrocarbon gases under high temperature and in the presence of a catalyst. Natural gases such as the more volatile constituents of casing head gasoline, are useful for this purpose. Gases separated from stabilizers in the natural gasoline industry may be conveniently employed. Refinery gases comprising saturated compounds such as those escaping from storage tanks, treating equipment and crude stills, and cracked gases such as those evolved from cracking stills or hydrogenation systems may also be treated according to the process of the invention. Gases from the pyrolysis treatment such as that of the present invention may be recirculated into the same or similar equipment to be retreated to produce further quantities of aromatic compounds. These gases, preferably, consist of saturated or unsaturated hydrocarbons containing not in excess of six carbon atoms, such as saturated compounds lying between methane and pentane and unsaturated compounds of approximately the same number of carbon atoms. It is to be understood, however, that inasmuch as unsaturated compounds are usually more volatile than saturated compounds of the same molecular weight, it may be desirable in some cases to treat unsaturated gases of somewhat higher number of carbon atoms than that specified in the preferred example.

In accordance with the invention the gas to be treated, which may, if desired, be previously processed to remove certain undesirable constituents such as hydrogen sulphide or fractionated to separate certain hydrocarbon constituents, is subjected to the action of a suitable catalyst at a high temperature. The gas is preferably passed in a restricted stream through a catalyst, the rate of flow and the temperature having been predetermined to give the maximum yield of desirable products. The process is preferably carried out in a tubular heater, certain tubes of which are packed with a suitable catalyst. It is often desirable to preheat the gases and then subject them to the action of the catalyst in reaction tubes arranged to provide sufficient conversion with a minimum deposition of carbon. The reaction products may be rapidly cooled to halt the reaction and the carbon separated, if desired, prior to the condensation and fractionation of the aromatic compounds. The separation and purification of the aromatic products are then accomplished by methods well known in the art of recovering such materials from coal gas.

The process of the invention is based primarily on the tendency of hydrocarbon gases at high temperatures to dissociate into unstable products which under suitable conditions recombine to form aromatic derivatives. While hydrocarbon gases under the influence of temperature alone may produce limited amounts of aromatic compounds, nevertheless, the product formed in this way is usually a mixture of compounds of bad color, undesirable odor and frequently difficult to separate. It has been found, however, that the process may be more efficiently carried out and the yield of low boiling liquid products, which are useful in the manufacture of motor fuels, substantially increased by the use of catalysts.

A catalyst suitable for use in the invention may be selected from groups of several materials. The catalyst is preferably porous so that maximum surface for contact is provided and at the same time sufficient spaces within the material are allowed for the free passage of gases therethrough. Certain porous materials are efficient catalysts within themselves. A group of such materials may comprise silica gel, activated carbon, pumice, bauxite, fuller's earth, or Attapulgus clay. It has been noted that certain of the aforementioned catalysts are improved by deposition thereon of carbon during the reaction. Thus silica gel and pumice show a gradual increase in efficiency during use which reaches a maximum only after considerable time and relatively large quantities of carbon have been deposited thereon.

Other materials which have been found to be particularly useful for catalysts in the process of the invention comprise a certain group of metal oxides. This group may include such materials as zinc oxide, aluminum oxide and nickel oxide. Due to the difficulty of obtaining large quantities of these oxides in a porous condition, it is preferable to deposit them on the surface of a suitable supporting material. The supporting material is preferably porous, thereby providing large surfaces upon which the catalytic oxides may be deposited. A group of materials suitable for supporting agents comprise bauxite, carbon, silica gel, and pumice. The supporting material itself may be somewhat catalytic, but the deposition of the metal oxides thereon will materially increase its efficiency.

The deposition of the metal oxide upon the supporting material may be accomplished by soaking the porous material in a strong solution of a salt of the metals. The nitrates are most satisfactory for this purpose, since they readily decompose under heat into the oxides. It is often desirable to roast the material to be impregnated at a temperature of 500° C. to 600° C. prior to the saturation with the nitrate solution. Such a roasting treatment tends to dehydrate the porous material and in some cases increase the porosity. The material, after saturation with the nitrate solution, is then heated to about 600° C. to 700° C. to decompose the nitrate into the oxide and deposit the latter uniformly upon the surfaces of the pores of the supporting material. In this way silica gel may be soaked in saturated solutions of aluminum nitrate, zinc nitrate or other desired metallic nitrates to thoroughly saturate the pores and then the saturated material ignited at 600° C. for about three hours; a coat of the oxide of the desired metal remains deposited on the surface of the supporting material in such a way that an active catalyst results.

The temperature for the process of the invention may vary according to the type of the catalyst and the nature of the hydrocarbons treated; however, for most gases it is quite well defined. In general, it has been found that temperatures between 650° C. and 950° C. will prove satisfactory in the treatment of all hydrocarbons within the scope of the invention.

The temperature usually varies inversely with the molecular weight of the hydrocarbons treated, and especially is this true in the case of saturated or paraffin hydrocarbons. The light gases, therefore, will require the higher temperature while the heavier will require the lower temperatures; thus methane may be conveniently converted at temperatures in the neighborhood of 950° C. while pentane or hexane may give best yields at temperatures nearer 650° C. The series of compounds between methane and hexane of increasing molecular weight will require correspondingly intermediate temperatures. When treating butane, for example, satisfactory results have been obtained in the neighborhood of 800° C. Since most gases consist of a mixture of various hydrocarbons, the temperature will necessarily be an average of the optimum temperatures for the various constituents of the mixture and for that reason I do not wish to limit myself to any definite temperature, but rather to indicate a range of temperatures.

It is desirable that the process be continuous if possible, although continuous operation is ordinarily prevented by the deposition of carbon upon the catalytic material. The carbon deposited in this way, however, is conveniently removed by discontinuing the passage of the hydrocarbon gas through the catalyst and admitting air to the hot catalytic material. The combustion produced by the action of the air on the carbon quickly removes the carbon and revivifies the catalyst.

A low superatmospheric pressure, preferably near atmospheric, is ordinarily used although in some cases it may be desirable to increase the pressure a substantial amount. It may be desirable also, under certain conditions, to compress the reaction products to a high pressure in order to cause condensation of the vapors and polymerization of unstable constituents and the invention therefore contemplates such procedure.

The yields of aromatic products obtained by the process of the invention will necessarily vary within quite wide ranges depending on operating conditions and the character of the charging materials. By treatment of gases within the scope of the invention and substantially as described, one to three gallons of liquid aromatic products, suitable for use as anti-knock fuel or for blending with gasoline to improve the anti-knock quality, may be obtained per 1000 cu. ft. of charging material.

While the process has been described as particularly adapted to be carried out in the presence of a catalyst, the invention is not limited to such a procedure. Certain hydrocarbon gases, such as those from the conversion of higher boiling hydrocarbon oils into lower hydrocarbon oils, may be successfully converted as heretofore described into aromatic compounds without the use of a catalyst. Thus gases from certain liquid phase cracking and particularly vapor phase cracking stills, as well as cracked gaseous products from hydrogenation systems and residual gaseous hydrocarbons from pyrolytic treatment of natural gases may be successfully converted into aromatic products under the influence of temperature alone, the temperatures in such a procedure ranging substantially as heretofore specified.

Obviously many modifications and variations of the invention, as hereinbefore set forth, may be made without departing from the spirit and scope thereof, and therefore only such limitations should be imposed as are indicated in the appended claims.

I claim:

1. In the manufacture of liquid aromatic compounds, such as benzol and its homologues, from gaseous hydrocarbons, the process that comprises subjecting normally gaseous hydrocarbons containing a large proportion of paraffinic constituents heavier than methane, to a conversion temperature of about 650° to about 950° C. while in the presence of a clay type of catalyst selected from the group consisting of bauxite and fuller's earth, and separating the aromatic compounds from the products of reaction.

2. In the manufacture of liquid aromatic compounds, such as benzol and its homologues, from gaseous petroleum hydrocarbons, the process that comprises passing normally gaseous hydrocarbons, containing a large proportion of paraffinic constituents such as propane and butane, through a catalyst of the adsorptive clay type selected from the group consisting of bauxite and fuller's earth, while maintaining a temperature of about 650° to about 950° C., and separating from the resulting products of reaction liquid hydrocarbons suitable for the manufacture of motor fuels.

CHARLES C. TOWNE.